(No Model.)
S. T. BRALEY.
SCALE BEAM.
No. 509,591. Patented Nov. 28, 1893.
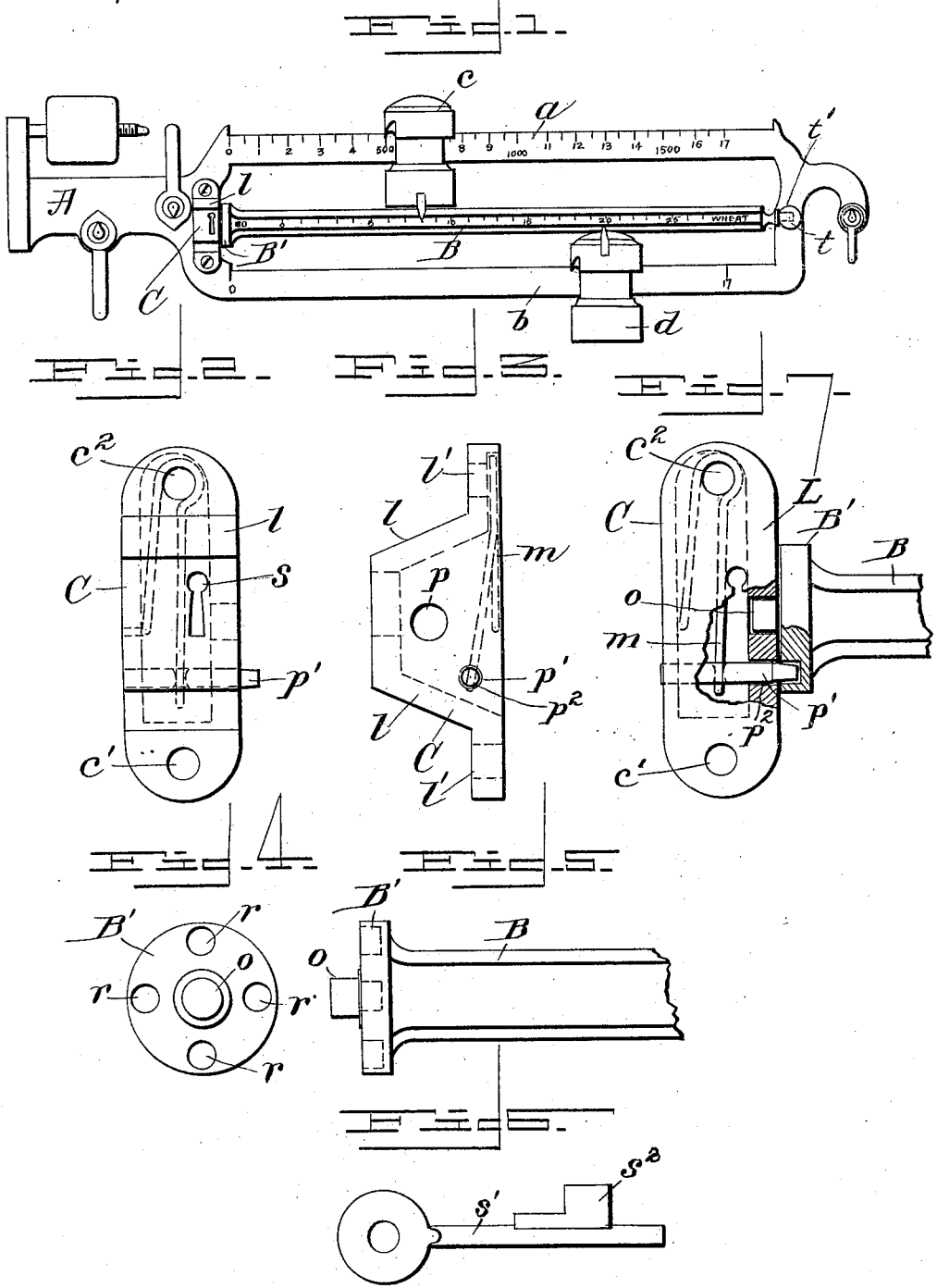
Witnesses
W. H. Humphrey
James Town
Inventor
Samuel T. Braley
BY C. S. Watton
Attorney
THE NATIONAL LITHOGRAPHING COMPANY,
WASHINGTON, D. C.

UNITED STATES PATENT OFFICE.

SAMUEL T. BRALEY, OF RUTLAND, VERMONT, ASSIGNOR TO THE HOWE SCALE COMPANY OF 1886, OF SAME PLACE.

SCALE-BEAM.

SPECIFICATION forming part of Letters Patent No. 509,591, dated November 28, 1893.

Application filed June 26, 1893. Serial No. 478,867. (No model.)

*To all whom it may concern:*

Be it known that I, SAMUEL T. BRALEY, a citizen of the United States of America, residing at Rutland, in the county of Rutland and State of Vermont, have invented certain new and useful Improvements in Scale-Beams, of which the following is a specification.

My invention relates to improvements in grain scale beams, especially to revolving scale rods.

The object of my invention is to provide a locking device to securely hold a revolving scale rod in any one of several positions to avoid displacements either by accident or design after the scale rod has been set in any desired position.

For a full and clear understanding of my invention reference is to be had to the accompanying drawings in which corresponding letters indicate like parts in the several views.

Figure 1, is a view in side elevation of a scale beam embodying my improvements. Fig. 2, is a view in front elevation of the locking device, and Fig. 3, is a side elevation of the same. Figs. 4 and 5, are detailed views of the end of the revolving scale rod adjacent to the locking device. Fig. 6, is a side elevation of the key, and Fig. 7, is a similar view, partly broken away, illustrating the scale rod locked in position by the locking device.

In the drawings: A represents the frame of the scale beams of usual construction with a counter poise, consisting of an upper rigid graduated scale beam $a$, and a lower arm or beam $b$, upon which are mounted sliding poises $c$ and $d$.

B is a scale rod of rectangular form or having more than four faces upon which are marked scales of different graduations. The outer end of this beam is provided with a stud $t$ (see Fig. 1) which fits in a socket or bearing $t'$ in the outer end of frame A about midway between beams $a$ and $b$, as shown.

Rod B has an enlarged inner end B' of cylindrical shape provided with apertures $r$ in its outer face, also a central projecting stud $o$.

C is a locking device, consisting of a casing L with two flaring walls $l$, outwardly shaped like the frustum of a wedge, and having at the base of walls $l$, flanges $l'$ with rounded ends in which are apertures $c'$, $c^2$, to permit the casing to be fastened by screws or bolts to scale beam A between the inner ends of beams $a$, and $b$, by means of corresponding apertures in beam A.

Centrally situated in the outer face of casing C, is a circular aperture or bearing $p$, see Fig. 3, in which stud $o$, on rod B rests.

$m$ is a U shaped spring securely fastened, in any well known manner, at one end to the inside of the inner wall of casing C, extending upwardly then downwardly, the other end of the spring being longer and securely attached at right angles to a pin $p'$, in the casing which, with the spring in its normal position, projects through an aperture $p^2$ in the outer face of casing C, below aperture $p$ as shown, aperture $p^2$ acting as a guideway for the pin. Pin $p'$ is parallel with beam A.

S is a key hole in the front face of casing L, and S' a key, having a ward S², which fits in said key hole.

The long arm of spring $m$ in its normal position, (see Fig. 2,) rests at the left hand side in proximity to the key hole, in such a position that when the key is inserted in the key hole and turned to the right, the ward of the key will bear against the long arm of the spring, force the same to the left, overcoming the tension of the spring, at the same time, withdrawing pin $p'$, within the casing.

The relation of aperture $r$ in the end B' of rod B to aperture $p^2$ in the casing is such that when the rod is in position and revolved, apertures $r$ will register with aperture $p^2$, pin $p'$ being withdrawn.

The operation of the device is as follows: When any particular scale on the revolving scale rod not in position is desired to be used, key S' is inserted in the key hole and turned to the right to cause the ward of the key to contact with the long arm of spring M to withdraw pin $p'$ from engagement with any aperture $r$ with which it may be engaged, there being as many apertures $r$ as there are graduated faces on the rod; scale rod B is then revolved by the hand until the desired scale is brought into proper position, a corresponding aperture $r$ registering with aperture $p^2$ on the casing, key S' is then turned to the left and withdrawn allowing spring M to assume its normal position, see Fig. 7, the outer end of the pin engaging an aperture $r$ in end B of the scale rod thus securely locking the rod in the position desired.

Having described my invention, what I claim as new, and desire to secure by Letters Patent, is—

The combination with a scale-beam and a revolubly mounted scale-rod carried by the beam, of a spring-actuated locking-bolt adapted for engaging and locking said scale-rod, an inclosing casing for said bolt and spring, and a key detachably connected with the spring for throwing said bolt in and out of engagement with the scale-rod, as specified.

In testimony whereof I affix my signature in presence of two witnesses.

SAMUEL T. BRALEY.

Witnesses:
CARL B. HINSMAN,
EDWARD V. ROSS.